Cash O. Mefford
Granvel D. Massey
INVENTORS

Feb. 5, 1952     C. O. MEFFORD ET AL     2,584,900
COMBINATION CHECK AND BLOCK VALVE
Filed March 18, 1949     2 SHEETS—SHEET 2
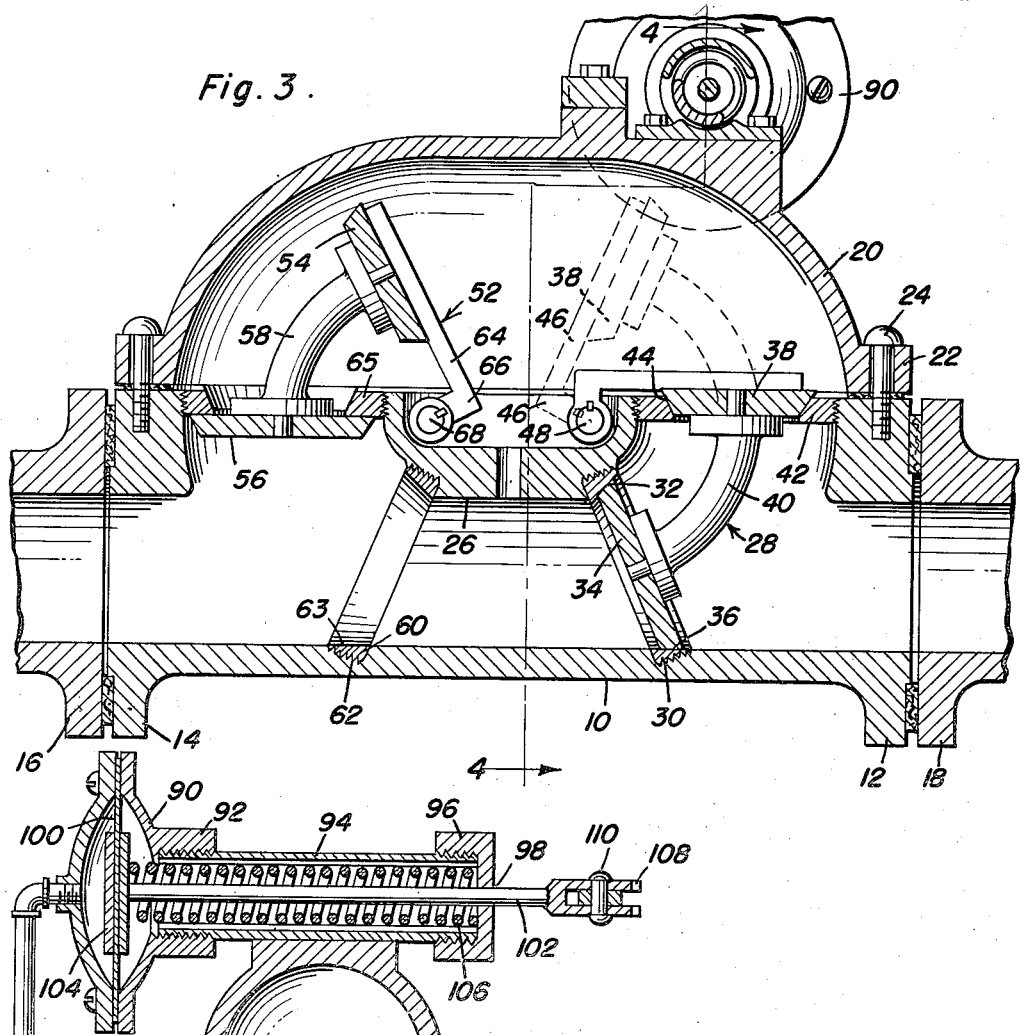
Fig. 3.
Fig. 4.
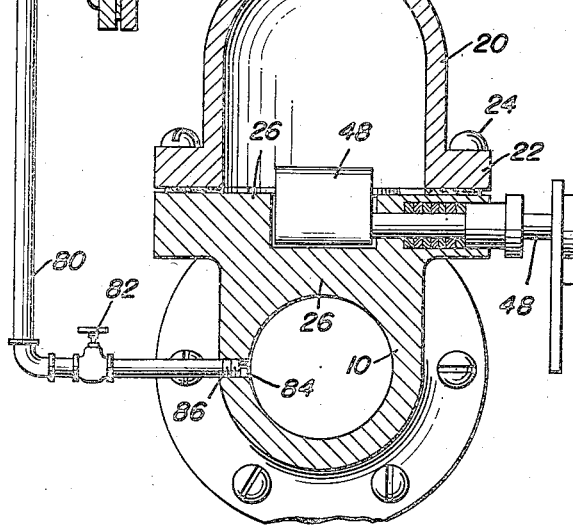
Cash O. Mefford
Granvel D. Massey
INVENTORS Patented Feb. 5, 1952

2,584,900

UNITED STATES PATENT OFFICE 2,584,900

COMBINATION CHECK AND BLOCK VALVE

Cash O. Mefford, Sapulpa, and Granvel D. Massey, Tulsa, Okla., assignors of one-third to Harry W. Evans, Sapulpa, Okla.

Application March 18, 1949, Serial No. 82,082

7 Claims. (Cl. 137—144)

This invention relates to improvements in a valve structure for use in a fluid conducting system and has for its primary object to automatically stop the flow of fluid in a conduit or pipe system and to prevent back flow.

Another object of this invention is to provide an automatically operated check valve, that will interrupt and prevent the back flow of fluid, upon an interruption of the supply flow or a decrease of pressure, by the interposition of a positive barrier in the fluid supply conduit between the source and the supply point.

Another important object of this invention is to automatically stop the flow of a fluid from a supply source in the event that there is a break in the conducting system downstream from the valve, thereby preventing any loss of fluid.

Another important object of this invention is to provide a simple and inexpensive valve structure that is mounted in a casing adapted for installation in a fluid circuit, the valve structure automatically functioning to prevent a back flow of the fluid to the source and to close off the casing from the source upon a predetermined decrease of fluid pressure.

These and ancillary objects and structural features of merit are attained by this invention, a preferred embodiment of which is set forth in the following description and illustrated in the accompanying drawings, wherein:

Figure 3 is a vertical sectional view taken on line 3—3 of Figure 1, and

Figure 4 is a vertical sectional view taken on line 4—4 of Figure 3.

Figure 1:
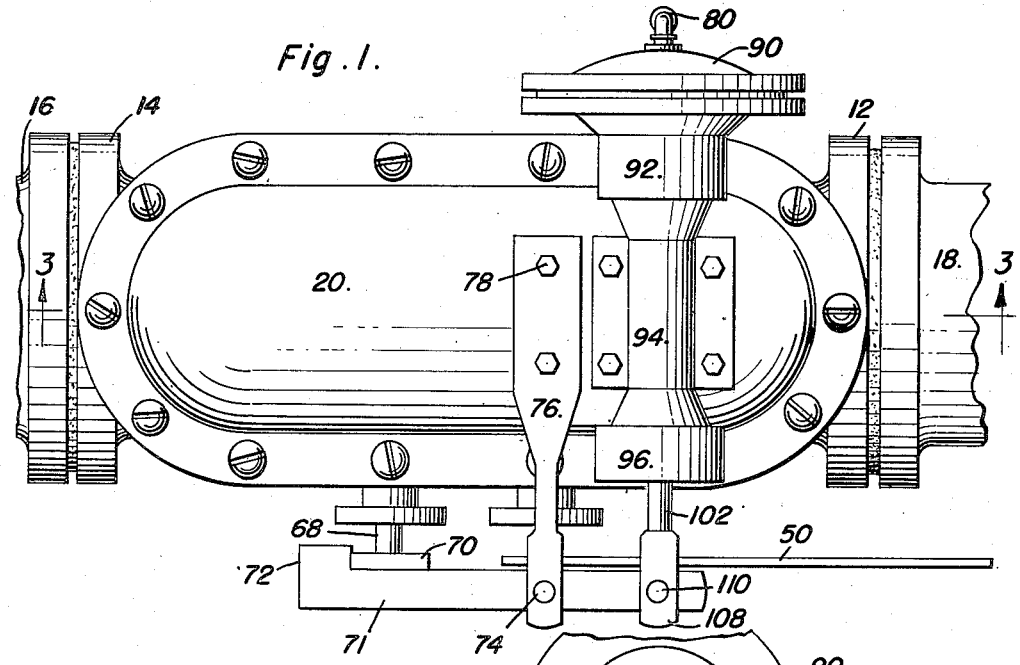
Figure 1 is a top plan view of the device, constructed in accordance with the principles of the instant invention.

Referring to the drawings, the numeral 10 designates a casing having flanged ends 12 and 14, the end 12 being secured to an inlet conduit 16, while the end 14 is associated with an outlet conduit 18, the respective conduits or pipes being secured to the respective ends of the casing in any conventional manner.

A dome-like elongated member 20 is adapted for attachment in closure placement over the upper open portion of the casing, the same being provided with a lateral attaching flange 22 bolted to the casing by means of the bolts 24.

A central web 26 is formed in the casing and provides means for pivotally securing a check or gravity actuated valve assembly 28. An annular valve seat 30 is angularly disposed in the casing 10 and threaded into position. The valve seat is formed with an inner beveled wall 32 to securely seat the check valve 34, having a complementary beveled periphery 36. The check valve 34 is associated with a similar valve 38 by means of an arcuate stem 40. A valve seat 42 is threaded in a horizontal position into the casing between the end 12 and the central web 26, the same being provided with an inner beveled surface 44, the annular ring seat 42 being detachable and functioning to securely seat the valve 38. An actuating member 46 is secured to the valve plate 38 and is disposed on a laterally extending shaft 48 rotatably journaled in the casing, within the central web. The shaft extends laterally and terminates outwardly, the outer end being formed to accommodate an elongated handle 50. By means of the handle 50, the check valve can be manually opened but the same will close automatically, upon an interruption of the flow from the supply or inlet point 16. Due to the weight of the actuating member 46, the same being secured off center onto the rotating shaft 48, the entire valve assembly will drop downwardly from the position shown in Figure 3 to a closing position. The valve 34 will seat in the valve seat 30 and will prevent the back flow or counter-flow from the service conduit 18, thereby isolating the end 12 from the end 14.

Means is provided for closing off the flow to allow the valve 28 to close and to prevent the opening thereof by an increase flow thereby preventing loss of the fluid in the event that a line break occurs. The means is preferably automatic and pressure responsive, so that the same is actuated by a decrease in pressure in the casing behind the valve seat 30, as by a decrease in the flow from the inlet conduit.

Figure 2:
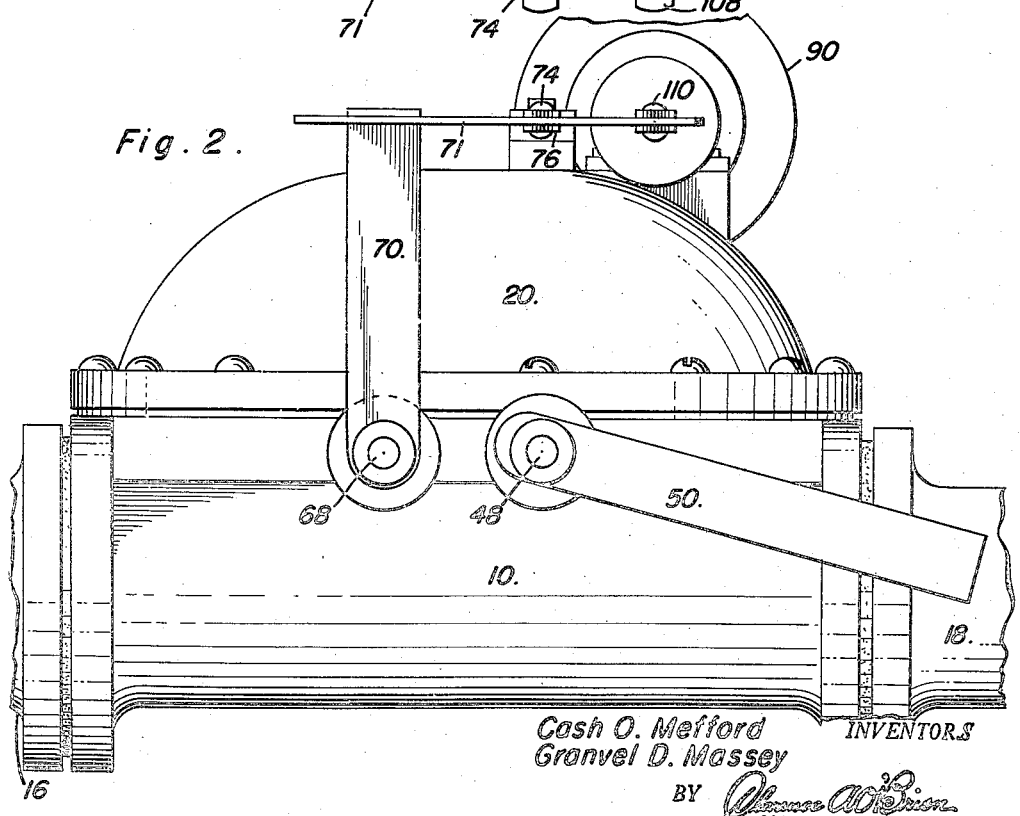
Figure 2 is a side elevational view, showing the form of the invention disclosed in Figure 1.

The means includes a valve assembly 52, including a pair of complementary valve plates 54 and 56 joined by an arcuate stem 58. The valve 56 is adapted to seat in an annular valve seat 60, which is provided with an externally threaded outer wall 62 for engagement in the casing, similar to the placement of the valve seat 30 but at an inclined angle therefrom. The valve seat is formed with inclined or beveled walls 63 to securely seat and receive the beveled periphery of the valve plate. In a similar manner to the structure and placement of the valve seat 42 a valve seat 65 is provided for the valve plate 54. An actuating member 64 is carried by the valve plate 54 and is provided at its end with an offset extension 66 keyed or otherwise fixed to the lateral shaft 68 which is rotatably journaled in the casing. The shaft 68 extends outwardly of the casing and is secured to a lever 70, which is normally held in a vertical position, so that the shaft 68 retains the valve assembly in a normally open position, as shown in Figure 3. Suitable means may be provided for retaining the lever in an open position, as seen in Figure 2 and may structurally include a latching arm 71, having a lateral end 72 which is adapted to engage on the lever 70 and hold the same in a vertical position, as seen in Figure 1. The arm 71 is pivoted as at 74 to a bracket 76 which extends laterally from the cover 20 and is bolted thereto as at 78.

Means is provided for retaining the latch end 72 of the arm 71 in engagement with the lever 70 and is preferably a pressure responsive device, so that during the normal flow of the fluid through the casing, the lever 70 is held in a secure position to prevent the valve assembly 52 from closing and interrupting the flow. However, should the pressure drop below a predetermined point, means is provided for disengaging the latch end 72 from the lever and actuating the valve assembly 52 to close off the casing from the inlet conduit and to allow the block valve assembly to close.

In this respect, a pipe system 80, provided with conventional valve means 82 for selectively closing off the same is provided. The pipe system extends from the casing and is communicated therewith by means of a lateral port 84 within which the threaded end 86 of the pipe system is secured. A housing 90 is supported at the upper end of the pipe system and is provided with an internally threaded offset section 92 within which is secured one end of a cylinder 94. The opposite end of the cylinder is closed by a cap member 96 having a central opening 98. A diaphragm 100 is vertically disposed in the housing, between the two sections thereof and held in a fixed position by means of the retaining bolts for the two sections. A rod 102 is provided with an enlarged end 104 disposed in the housing or casing 90 and secured to the diaphragm 100. A spring 106 is disposed in the cylinder and concentrically disposed about the rod 102. The rod 102 terminates outwardly in a clevised end 108 within which the extending end of the arm 71 is pivoted by means of a vertical pivot pin 110.

Thus, it can be seen that when the flow is normal and enters through the inlet end of the casing 10 and through the outlet end, a certain amount of pressure will be present in the housing 90, the fluid being conducted to the housing by means of the pipe system 80 and acting upon the diaphragm to create a pressure on one side thereof. The pressure created on one side of the diaphragm places the spring in compression and holds the clevised end of the rod in an extended position, so that the latch end 72 of the arm 71 is held about the lever 70. However, when the flow of fluid through the casing is interrupted and the pressure decreases, allowing the check valve assembly 28 to gravitate about its horizontal axis, through the weight of the arm or lever 50 and the actuating member 46, the pressure in the pipe system is accordingly decreased.

A decrease of pressure in the housing 90 allows the spring 106 to return the diaphragm to its normal position and move the operating rod 102 inwardly, the pivoted end of the arm 71 being moved inwardly disengaging the hook or latch end 72 from the lever 70. As the lever 70 is disengaged, the same is free to move downwardly, the weight of the lever and the actuating member 64 allowing the block valve assembly 52 to gravitate downwardly, the valve plate 56 seating in its seat in the casing. When the valve 56 is seated, the casing is closed off from the inlet and if the pressure increases or if the flow increases, the same is prevented from gaining admission to the casing and from acting upon the check valve to force the same upwardly.

At a predetermined time, when the correct pressure is present in the conduit system, by manual means, the valve assembly 52 can be returned to its inoperative position, whereupon the pressure in the casing will be carried by the piping system 80 and again being present in the housing 90 will force the operating rod outwardly.

Repositioning of the valve assembly 52, allows the flow to enter the casing and force the check valve upwardly, the operation continuing without interruption, until there is a decrease in pressure. An opening is formed in the web 26 between seats 30 and 60 to allow the fluid trapped in the upper portion when the valves are closed to return when the valves are opened.

Thus, it can be seen that there is provided an inexpensive and economical valve structure, which is adapted for insertion in a fluid supply conduit or any other type of fluid conducting structure, the same dependably functioning to prevent a return flow from a service line to the supply or main line and responsive to a decrease of fluid pressure present in the casing for the valve structure functioning to close off the casing from the source or inlet.

Of course, it is to be understood that while this invention has been disclosed as applied between an inlet conduit and a supply conduit or outlet conduit for a fluid conducting system, that the same is equally applicable for use in any type of fluid conducting system and at any point therein for preventing a return flow of the fluid or a continuation of flow of fluid upon a decrease of pressure as would be caused by a broken conduit.

It is to be noted that the casing is so constructed and the valve plate arrangement is such that a pipe cleaning device may pass through the valve. Also when the valve is closed with pressure behind it, the forces acting on the valve plates from the internal pressure are opposed to each other. Then little outside force on the operating lever is required to open the valve.

Therefore, while there is shown the preferred form of the invention and the method of practicing the same, it is to be understood that various changes may be carried out, coming within the spirit and scope of the appended claims.

Having thus described the invention, what is claimed as new is:

1. In a fluid supply conduit, a casing interposed in said conduit and having inlet and outlet ends and a centrally disposed web dividing the casing into two chambers, each of said chambers communicating with said inlet and outlet, valve seats formed in said web and in said casing, a check valve swingably disposed in said casing and including a pair of connected valve disks, said valve disks being gravity operated upon a decrease of pressure in the casing to close off the outlet end of the casing from said chambers, means swingably mounted adjacent the inlet end of the casing for closing off said chambers from the supply conduit, means for normally holding said last means out of closing placement, release means for said holding means responsive to a decrease of fluid pressure in the casing for releasing said holding means.

2. The combination of claim 1, wherein said means for closing off the inlet end of the casing includes a pair of valve disks, a stem connecting said disks, valve seats for said chambers and cooperating with said disk and disposed in said casing and web.

3. The combination of claim 1, wherein said holding means includes a lever associated with said means for closing off the inlet end, a latching arm for said lever, said pressure responsive means actuating said latch arm to release said lever.

4. The combination of claim 3, wherein said last means includes a pipe system communicated with the casing, a housing associated with said pipe system, an operating rod slidably disposed in said housing and connected to said arm.

5. The combination of claim 4, wherein said arm is pivotally mounted on the casing.

6. The combination of claim 1, wherein said last mentioned means includes a housing communicated with the casing, a diaphragm disposed in the housing and a rod associated with the diaphragm, said diaphragm being responsive to a predetermined fluid pressure in the casing for holding said rod in an extending position.

7. The combination of claim 6, wherein resilient means is disposed about the rod and associated with the diaphragm for moving the rod inwardly to release position upon a decrease of pressure in the casing.

CASH O. MEFFORD.
GRANVEL D. MASSEY.

REFERENCES CITED

The following references are of record in the file of this patent:

UNITED STATES PATENTS

| Number | Name | Date |
|---|---|---|
| 613,600 | Plant | Nov. 1, 1898 |
| 908,337 | Shad | Dec. 29, 1908 |
| 1,060,336 | Gillispie | Apr. 29, 1913 |
| 1,219,627 | Coffman | Mar. 20, 1917 |
| 1,460,900 | Harris | July 3, 1923 |
| 1,727,503 | Franzheim | Sept. 10, 1929 |
| 2,076,566 | Isbell | Apr. 13, 1937 |